(12) United States Patent
Zhang et al.

(10) Patent No.: US 8,437,803 B2
(45) Date of Patent: May 7, 2013

(54) BASE STATION AND MOBILE STATION

(75) Inventors: Yuantao Zhang, Beijing (CN); Jun Tian, Beijing (CN); Jianming Wu, Beijing (CN); Jian Wang, Beijing (CN); Jie Zhang, Beijing (CN)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/235,563

(22) Filed: Sep. 19, 2011

(65) Prior Publication Data

US 2012/0009980 A1 Jan. 12, 2012

Related U.S. Application Data

(63) Continuation of application No. PCT/CN2010/070295, filed on Jan. 21, 2010.

(30) Foreign Application Priority Data

Mar. 20, 2009 (CN) .......................... 2009 1 0128652

(51) Int. Cl.
*H04W 88/02* (2009.01)

(52) U.S. Cl.
USPC ........ 455/562.1; 455/443; 455/504; 455/132; 455/234.1; 455/575.7; 370/249; 370/330; 370/334; 370/335; 370/260

(58) Field of Classification Search .... 455/456.1–456.2, 455/443, 504, 132, 234.1; 370/330, 249, 370/335, 334, 260, 328
See application file for complete search history.

(56) References Cited

U.S. PATENT DOCUMENTS

| 8,184,544 | B2 * | 5/2012 | Ko et al. ................. 370/249 |
| 2008/0107158 | A1 | 5/2008 | Yoshii et al. |
| 2008/0212550 | A1 | 9/2008 | Han et al. |
| 2008/0225993 | A1 | 9/2008 | Malladi et al. |
| 2008/0232484 | A1 | 9/2008 | Budianu et al. |
| 2008/0298438 | A1 | 12/2008 | Song |
| 2009/0285173 | A1 * | 11/2009 | Koorapaty et al. ........ 370/330 |

OTHER PUBLICATIONS

Fujitsu; "DL Reference Signal Design for 8x8 MIMO in LTE-Advanced"; Agenda Item 12.4; Document for: Discussion; R1-090706; 3GPP TSG-RAN1 #56, Athens, Greece, Feb. 9-13, 2009.
Samsung: "DL RS Designs for Higher Order MIMO" Agenda Item 12.4; Document for: Discussion; R1-090619; 3GPP TSG RAN WG1 #56, Athens, Greece, Feb. 9-13, 2009.

(Continued)

*Primary Examiner* — Kiet Doan
*Assistant Examiner* — Michael T. Vu
(74) *Attorney, Agent, or Firm* — Myers Wolin, LLC

(57) ABSTRACT

A base station and a mobile station, the base station includes common antennas configured to transmit signals to all mobile stations (UEs) served by the base station; a special antenna to transmit a signal to a UE which is served by the base station and supports the special antenna; a sub-frame selecting unit to select a sub-frame for transmitting a common pilot of the special antenna in the current frame; a resource block (RB) selecting unit to select a RB for transmitting the common pilot, in the sub-frame for transmitting the common pilot selected by the sub-frame selecting unit; a notifying unit to notify the sub-frame and RB for transmitting the common pilot antenna selected by the UE supporting the special antenna in a cell; and a transmitting unit to transmit a signal having the common pilot in the RB selected by the RB selecting unit.

10 Claims, 12 Drawing Sheets

OTHER PUBLICATIONS

Second Office Action issued for corresponding Chinese Patent Application No. 200910128652.2, dated Sep. 20, 2012, with English translation.

Chinese Office Action issued for corresponding Chinese Patent Application No. 200910128652.2 dated Jun. 13, 2012 with English translation.

Third Office Action issued for corresponding Chinese Patent Application No. 200910128652.2, issued Dec. 13, 2012, with an English translation.

* cited by examiner

BASE STATION AND MOBILE STATION

CROSS REFERENCE TO RELATED APPLICATIONS

This is a continuation of Application PCT/CN2010/070295, filed on Jan. 21, 2010, now pending, which claims priority to Chinese Patent Application No. 200910128652.2, filed on Mar. 20, 2009, now pending, the contents of which are herein wholly incorporated by reference.

TECHNICAL FIELD

The present invention generally relates to the field of wireless communication system, and particularly, to base station and mobile station in a hybrid system comprising mobile stations supporting fewer antennas and more antennas.

BACKGROUND OF THE INVENTION

In order to improve the transmission efficiency of the wireless communication system, MIMO has become an inevitable choice for the wireless communication at present and in the future. In the MIMO-OFDM system, the usage of multiple transmitting/receiving antennas greatly increases the number of unknown parameters in the system. These unknown parameters shall be estimated using known pilot or training signals, but extra pilot sequences occupy a lot of physical resources, and the usage of multiple antennas brings a great challenge to the estimation of the unknown parameters.

For the convenience of allocating the physical resources in a high efficiency, a physical frame is usually divided into a plurality of sub-frames in the time domain, and each sub-frame is divided into a plurality of basic allocation units, i.e., resource blocks (RBs), in the frequency domain. For example, in the latest LTE standard, a frame of 10 ms includes 10 sub-frames, and each sub-frame includes 14 OFDM symbols; each sub-frame is divided into sub-blocks in the unit of 12 sub-carriers in the frequency domain, and the time-frequency RBs of the 12 sub-carriers and 14 OFDM symbols constitute a basic RB. FIG. 1 is a schematic diagram of a pilot distribution in a physical resource unit (time-frequency two-dimensional) when there are 4 transmitting antennas.

The design schemes of the reference signal of the conventional multi-transmitting antenna system are mainly based on the orthogonal pilot design criterion, i.e., resources occupied by the pilots of respective transmitting antennas are orthogonal to each other, so as not to cause mutual interferences between the receiving ends. In the LTE Rel-8 standard, the highest configuration of supportable transmitting and receiving antennas is 4×4. In order to support higher data transmission rates and more effectively utilize the valuable spectrum resources, an antenna configuration up to eight-transmitting and eight-receiving antenna shall be adopted in the currently discussed LTE Release-10 (LTE-A). In that case, if the orthogonal RS design is still used, the reference signal will occupy a lot of physical resources, which severely challenges a high-efficient and reasonable design of the reference signal. For this reason and in consideration of the pilot design of the LTE and LTE-A hybrid system, a design that uses special pilot and common pilot may be taken into account. The common pilot is adopted for the channel quality of the user measurement system of the LTE-A, and the pre-coded matrix or the like is used. The common pilot of Antennas 0 to 3 in the eight transmitting antennas of the LTE-A base station and the common pilot of the four transmitting antennas defined in the LTE have the same pilot pattern, i.e., a pilot pattern as illustrated in FIG. 1. The common pilot of Antennas 4 to 7 needs to occupy other time-frequency resources for a transmission. The special pilot is only available for an LTE-A user to whom a certain RB is scheduled, so as to perform a channel estimation and demodulate the data.

At present, some people propose to distinguish the sub-frames in each 10 ms frame in a time division multiplexing manner. That is, to classify the sub-frames into three categories: the first category is the LTE sub-frame, in which all RBs are scheduled to the LTE user; the second category is the LTE-A sub-frame, in which all RBs are scheduled to the LTE-A user; and the third category is the blended sub-frame, in which all RBs may be scheduled to the LTE user or the LTE-A user. In addition, some people propose to transmit the LTE-A common pilot in the LTE sub-frame. In the prior art, on one hand, the LTE-A common pilot interferes the data transmitted by the RBs in the LTE sub-frame; on the other hand, since some sub-frames can only be scheduled to the LTE-A user or the LTE-A user, the flexibility of system scheduling is decreased.

To be noted, the above descriptions of the conventional art are only made for the convenience of clearly and completely describing the technical solutions of the present invention, and for the convenience of the understanding by a person skilled in the art. It shall not be deemed that the above technical solutions are well known to a person skilled in the art just because these technical solutions have been described in the Background section of the present invention.

The literatures of the present invention are listed as follows and incorporated into this Specification by reference as if fully set forth herein.
1. [Patent Literature 1]: Han Jin-Kyu, et al., Method and apparatus for managing control channel in a mobile communication system using multiple antennas (US 20080212550 A1);
2. [Patent Literature 2]: Yoshii Isamu, et al., Radio Transmitter and pilot signal inserting method (US 20080107158 A1);
3. [Patent Literature 3]: Song Young-joon, et al., Pilot signals for synchronization and/or channel estimation (US 20080298438 A1);
4. [Patent Literature 4]: Budianu Petru Cristian, et., al. Methods and apparatus for improved estimation of selective channels in an OFDMA system with dedicated pilot tones (US 20080232484 A1);
5. [Patent Literature 5]: Malladi Durga Prasad, et al., Hybrid pilot configuration (US 20080225993 A1);
6. [Non-patent Literature 1]: R1-090706, "DL Reference Signal Design for 8×8 MIMO in LTE-Advanced", Fujitsu, 3GPP RAN1 #56 meeting, Athens Greece;
7. [Non-patent Literature 2]: R1-090619, "DL RS Designs for Higher Order MIMO", Samsung, 3GPP RAN1 #56 meeting, Athens Greece.

SUMMARY OF THE INVENTION

The embodiments of the present invention are proposed with respect to the above problems in the prior art, so as to relieve or overcome the defects existing in the prior art, and provide at least one beneficial choice.

In order to achieve the above object, the present application provides the following aspects.

Aspect 1: a base station, comprising: common antennas configured to transmit signals to all mobile stations (UEs) served by the base station; a special antenna configured to transmit a signal to a UE which is served by the base station and supports the special antenna; a sub-frame selecting unit configured to select a sub-frame for transmitting a common pilot of the special antenna in the current frame; a resource block (RB) selecting unit configured to select a RB for transmitting the common pilot of the special antenna, in the sub-frame for transmitting the common pilot of the special antenna selected by the sub-frame selecting unit; a notifying unit configured to notify the UE, which supports the special antenna, of the selected sub-frame and RB for transmitting the common pilot of the special antenna; and a transmitting unit configured to transmit a signal having the common pilot of the special antenna in the RB selected by the RB selecting unit.

Aspect 2: the base station according to aspect 1, wherein there are a plurality of special antennas, the transmitting unit transmits all or a part of the common pilots of the special antennas in the RB selected by the RB selecting unit.

Aspect 3: the base station according to aspect 1 or 2, further comprising a scheduling unit that preferentially schedules the sub-frame for transmitting the common pilot of the special antenna selected by the sub-frame selecting unit to the UE supporting the special antenna.

Aspect 4: the base station according to aspect 1 or 2, further comprising a judging unit, the judging unit judges whether the traffic amount of the mobile stations that are served by the base station and support the special antenna is more than a predetermined amount; when the judging unit judges that the traffic amount of the mobile stations that are served by the base station and support the special antenna is more than the predetermined amount, the transmitting unit transmits signals containing the common pilot of the special antenna, in the sub-frame for transmitting the common pilot of the special antenna selected by the sub-frame selection unit; when the judging unit judges that the traffic amount of the mobile stations that are served by the base station and support the special antenna is not more than the predetermined amount, the informing unit informs the mobile station supporting the special antenna that the common pilot of the special antenna will not be transmitted.

Aspect 5: a base station, comprising a judging unit, a transmitting unit and a notifying unit, the judging unit judges whether the traffic amount of the mobile stations that are served by the base station and support the special antenna is more than a predetermined amount; when the judging unit judges that the traffic amount of the mobile stations that are served by the base station and support the special antenna is more than the predetermined amount, the transmitting unit transmits signals containing the common pilot of the special antenna, in the sub-frame for transmitting the common pilot of the special antenna; when the judging unit judges that the traffic amount of the mobile stations that are served by the base station and support the special antenna is not more than the predetermined amount, the informing unit informs the mobile station supporting the special antenna that the common pilot of the special antenna will not be transmitted.

Aspect 6: a UE, comprising: a RB judging unit configured to judge whether a current RB transmits a common pilot of a special antenna; a common pilot acquiring unit configured to acquire the common pilot of the special antenna from the current RB, when the RB judging unit judges that the current RB transmits the common pilot of the special antenna; a processing unit configured to perform a processing of the common pilot of the special antenna for the common pilot acquired by the common pilot acquiring unit.

Aspect 7: the UE according to aspect 6, wherein there are a plurality of special antennas, the RB judging unit further judges the one(s) among the plurality of special antennas whose common pilot(s) being transmitted by the current RB, and the common pilot acquiring unit acquires the common pilot(s) of the judged special antenna(s).

Aspect 8: the UE according to aspect 6 or 7, wherein the common pilot acquiring unit treats the RB transmitting the common pilot of the special antenna judged by the RB judging unit as a RB scheduled to a UE not supporting the special antenna, so as to acquire a channel estimation value from the RB.

Aspect 9: the UE according to aspect 6 or 7, wherein the common pilot acquiring unit treats the RB transmitting the common pilot of the special antenna judged by the RB judging unit scheduled to another UE supporting the special antenna, so as to acquire a channel estimation value from the RB transmitting the common pilot of the special antenna.

Aspect 10: the UE according to aspect 6 or 7, wherein during a calculation of a channel estimation value of a RB not transmitting the common pilot of the special antenna in the sub-frame containing RBs transmitting the common pilot of the special antenna, the processing unit selects channel estimation values of RBs transmitting the common pilot of the special antenna adjacent in time and frequency domains to the RB not transmitting the common pilot of the special antenna, and acquires the channel estimation value of the RB not transmitting the common pilot of the special antenna through an interpolation of these channel values in proportion.

Aspect 11: a base station, comprising: common antennas configured to transmit signals to all mobile stations (UEs) served by the base station; a special antenna configured to transmit a signal to a UE which is served by the base station and supports the special antenna; a sub-frame selecting unit configured to select a sub-frame for transmitting a common pilot of the special antenna in the current frame; a notifying unit configured to notify the sub-frame for transmitting the common pilot of the special antenna selected by the UE supporting the special antenna in a cell; and a transmitting unit configured to transmit a signal having the common pilot of the special antenna in the RB selected by the sub-frame selecting unit.

Aspect 12: a communication method used in a base station, the base station comprising common antennas configured to transmit signals to all mobile stations (UEs) served by the base station; and a special antenna configured to transmit a signal to a UE which is served by the base station and supports the special antenna, the method comprising: selecting a sub-frame for transmitting a common pilot of the special antenna in the current frame; selecting a RB for transmitting the common pilot of the special antenna, in the selected sub-frame for transmitting the common pilot of the special antenna; notifying the UE, which supports the special antenna, of the selected sub-frame and RB for transmitting the common pilot of the special antenna; and transmitting a signal having the common pilot of the special antenna in the selected RB.

Aspect 13: a communication method used in a base station, comprising:

judging whether the traffic of a UE, which is served by the base station and supports a special antenna, is larger than a predetermined traffic;

transmitting a signal having a common pilot of the special antenna in a sub-frame transmitting the common pilot of the special antenna, when it is judged that the traffic of the UE, which is served by the base station and supports the special antenna, is larger than the predetermined traffic;

notifying the UE supporting the special antenna not to transmit the common pilot of the special antenna, when it is judged that the traffic of the UE, which is served by the base station and supports the special antenna is not larger than the predetermined traffic Aspect 14: a common pilot processing method used in a UE supporting a special antenna, comprising: judging whether a current RB transmits a common pilot of a special antenna; acquiring the common pilot of the special antenna from the current RB, when it is judged that the current RB transmits the common pilot of the special antenna; and performing a processing of the common pilot of the special antenna for the acquired common pilot.

Features described and/or illustrated with respect to one embodiment can be used in one or more other embodiments in a same or similar way, and/or combine with or replace features in other embodiments.

To be noted, the term "include/comprise/have" herein refers to existence of feature, component, step and assembly, not excluding existence or addition of one or more other features, components, steps, assemblies or a combination thereof.

BRIEF DESCRIPTION OF THE DRAWINGS

The drawings illustrate the preferred embodiments of the present invention and constitute a part of the Specification. The drawings detailedly elaborate the principle of the present invention together with the literal descriptions, in which.

DETAILED DESCRIPTION OF THE PREFERRED EMBODIMENTS

The embodiments of the present invention propose to a method for transmitting a common pilot of an LTE-A system, a method for scheduling data and a design of frame structure of the system caused thereby in the LTE and LTE-A hybrid system, fully considering the case that the LTE-A system is downward compatible with the LTE system.

Figure 1:
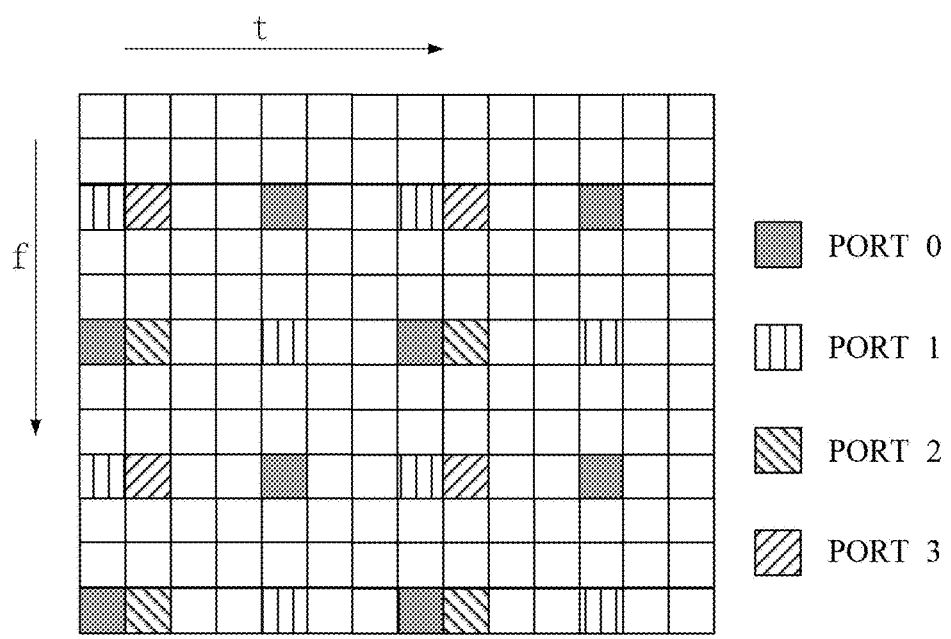
FIG. 1 illustrates distribution of pilots and data in a RB of an LTE system.
Figure 2:
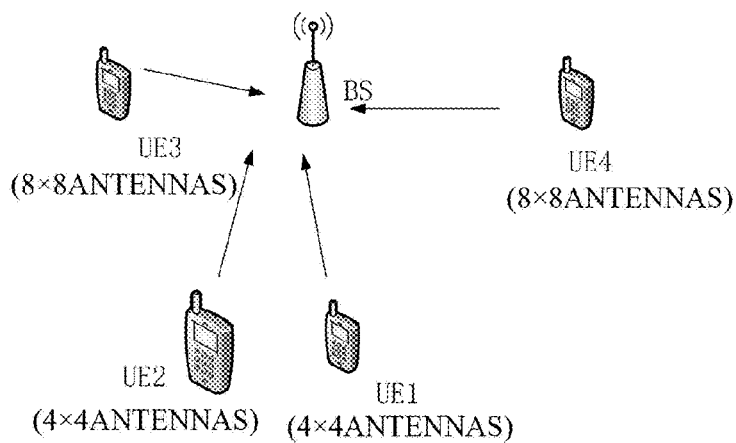
FIG. 2 illustrates a schematic diagram of a communication system according to an embodiment of the present invention.

FIG. 2 illustrates a schematic diagram of a communication system according to an embodiment of the present invention. As illustrated in FIG. 2, the communication system according to the embodiment of the present invention includes a base station (BS), a mobile station (UE, e.g., UE 1 and UE 2) supporting a configuration of relatively less transmitting and receiving antennas, and a UE (e.g., UE 3 and UE 4) supporting a configuration of relatively more transmitting and receiving antennas. Antennas causing the more transmitting and receiving antennas to be more than the less transmitting and receiving antennas are referred to as special antennas. Although FIG. 2 illustrates two UEs supporting the configuration of relatively less transmitting and receiving antennas and two UEs supporting the configuration of relatively more transmitting and receiving antennas, respectively, they are just exemplary and may be more or less.

In this text, a UE following the LTE is taken as an example of the UE supporting the configuration of relative less transmitting and receiving antennas, and a UE following the LTE-A is taken as an example of the UE supporting the configuration of relatively more transmitting and receiving antennas (i.e., the UE supporting the special antennas).

In an embodiment of the present invention, the maximum number of the transmitting antennas supported by the LTE-A is 8, and the maximum number of the transmitting antennas supported by the LTE is 4. In the designed frame structure, each 10 ms frame is divided into 10 sub-frames. But the embodiment of the present invention may also be applied to a system in which the maximum number of the transmitting antennas supported by the UE is not 8, and each 10 ms frame may be divided into sub-frames of a number other than 10.

Herein for the convenience of description, in the following examples, the serial numbers of the antennas supporting both the LTE and the LTE-A are set as 0 to 3; while the serial numbers of the antennas only supporting the LTE-A are set as 4 to 7 and those antennas are called as special antennas.

Embodiment 1

In the first embodiment of the present invention, the sub-frames in each 10 ms frame are distinguished based on the fact whether they transmit the LTE-A common pilot. The time-frequency RBs in the sub-frames of the first category transmit the common pilot of all or a part of Antennas 4 to 7;

while none of the RBs in the sub-frames of the second category transmits the common pilot of any of Antennas 4 to 7.

Figure 3:
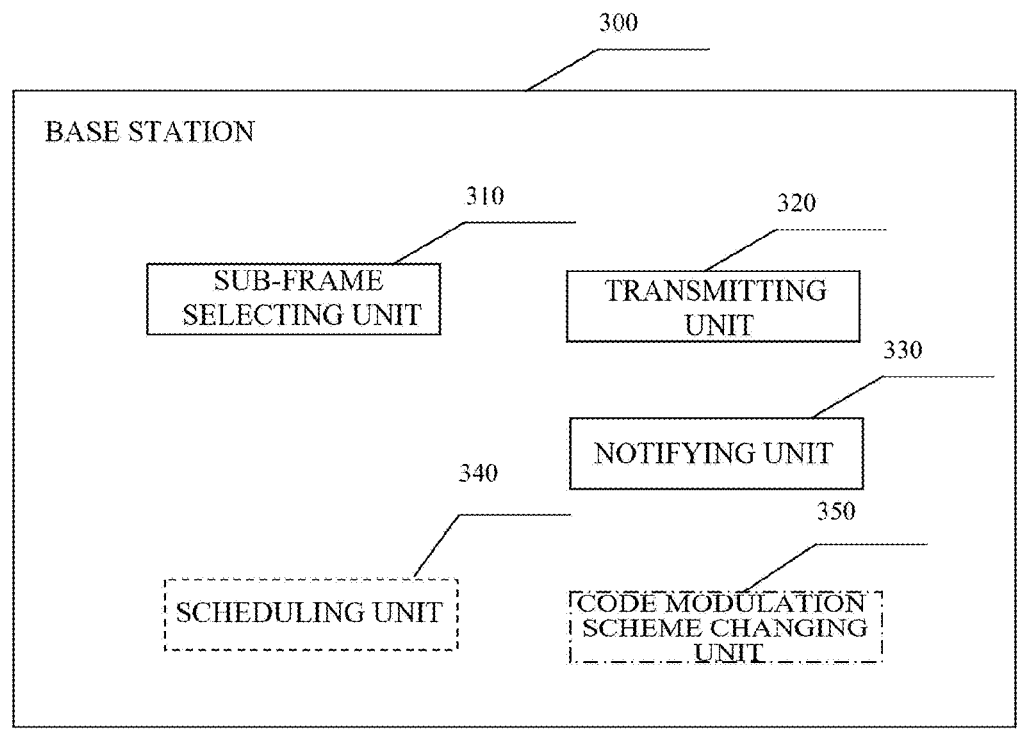
FIG. 3 illustrates a schematic block diagram of a base station according to first to third embodiments of the present invention.

FIG. 3 illustrates a schematic block diagram of a base station according to the first embodiment of the present invention. As illustrated in FIG. 3, a base station according to this aspect includes a sub-frame selecting unit 310, a transmitting unit 320 and a notifying unit 330.

The sub-frame selecting unit 310 selects a sub-frame in the current frame for transmitting a common pilot of the special antenna; the notifying unit 330 for example notifies, at the $0^{th}$ sub-frame of the current frame, a UE supporting the special antenna in the cell the selected sub-frame for transmitting a common pilot of a special antenna; the transmitting unit 320 transmits, at the sub-frame selected by the sub-frame selecting unit 310, a signal having the common pilot of the special antenna.

Figure 4:
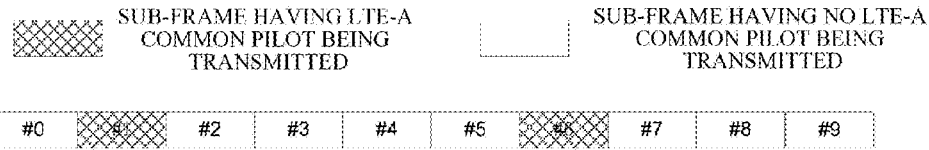
FIG. 4 schematically illustrates the categories of sub-frames of each 10 ms frame according to the first embodiment of the present invention.

FIG. 4 schematically illustrates the categories (frame structures) of sub-frames of each 10 ms frame according to the first embodiment of the present invention. As illustrated in FIG. 4, ten sub-frames are classified into two categories. The first category of sub-frames include sub-frames #1 and #6, in which each RB transmits the common pilot of all the eight antennas whether it is scheduled to the UE of the LTE or the UE of the LTE-A. The second category of sub-frames include sub-frames other than sub-frames #1 and #6, in which only the pilots of four antennas are transmitted at the pilot position when a certain RB is scheduled to the LTE user, and the pilot mode follows that of the current LTE standard, and when a certain RB is scheduled to the LTE-A user, not only the pilots of Antennas 0 to 3 are transmitted, but also the special pilot of the LTE-A user and the common pilot of Antennas 4 to 7 are transmitted at other pilot position.

To be noted, although FIG. 4 illustrates that the first category of sub-frames are sub-frames #1 and #6, other sub-frames may also be adopted. In addition, although FIG. 4 illustrates that the number of the first category of sub-frames is two, the number may be one, three or more.

In this embodiment, the sub-frame selecting unit 310 selects a sub-frame in the current frame for transmitting a common pilot of the special antenna; the transmitting unit 320 transmits, in each RB of the sub-frame selected by the sub-frame selecting unit 310, the pilots of all the special antennas (Antennas 4 to 7) of the LTE-A.

Figure 5:
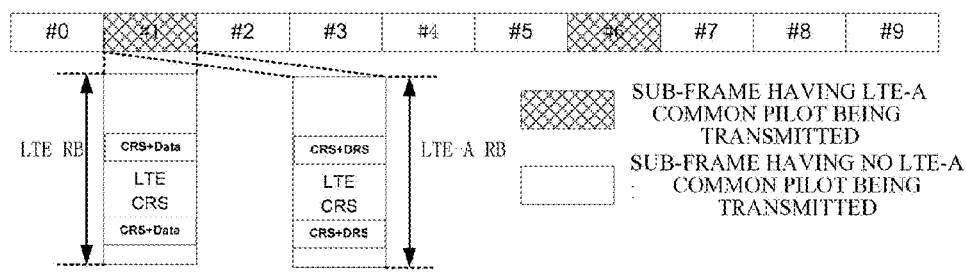
FIG. 5 schematically illustrates a pilot distribution in case an LTE-A common pilot overlaps LTE data in a RB, when sub-frames (of the first category) of the LTE-A common pilot are scheduled to the LTE and LTE-A users.

FIG. 5 schematically illustrates a frame structure and pilot distribution in case an LTE-A common pilot overlaps LTE data in a RB, when sub-frames (of the first category) of the LTE-A common pilot are scheduled to the LTE and LTE-A users (UE). As illustrated in FIG. 5, sub-frames #1 and #6 are the sub-frames for transmitting the LTE-A common pilot, which is not transmitted by any other sub-frame. The LTE-A common pilot distributions in case the RBs are scheduled to the LTE user and the LTE-A user are illustrated in sub-frame #1, respectively. When a RB is scheduled to the LTE user, the LTE-A common pilot and the LTE data are transmitted in an overlapped manner at the pilot insertion position. When a RB is scheduled to the LTE-A user, the LTE-A common pilot and the LTE-A special pilot DRS are transmitted after undergoing a code division multiplexing. To be noted, in the two RBs, the insertion position of the LTE-A common pilots are the same. When measuring information such as the channel quality, all the LTE-A users in the system take all RBs in sub-frames #1 and #6 as the RBs scheduled to the LTE user, and take the special pilots in the RBs actually scheduled to the LTE-A user as the data of a certain LTE UE, thus all the LTE-A UEs may be subjected to a uniform channel quality measurement.

When a certain LTE UE receives the data of a RB containing the LTE-A common pilot, since the UE does not know that the RB contains the LTE-A common pilot, it performs a normal data reception by treating the common pilot as interference.

Figure 6:
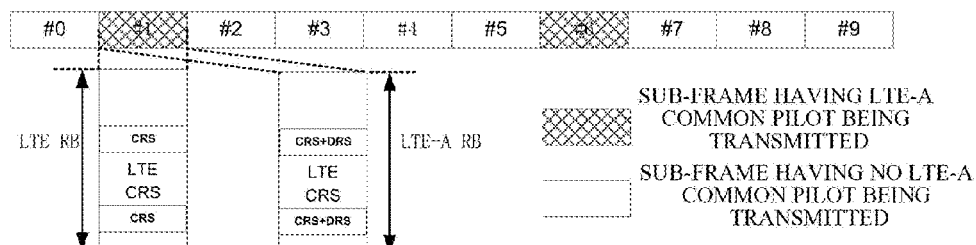
FIG. 6 schematically illustrates a frame structure and a pilot distribution in case some data sub-carriers in a RB are punched and used for LTE-A common pilot insertion, when sub-frames (of the first category) of the LTE-A common pilot are scheduled to the LTE and LTE-A users.

FIG. 6 schematically illustrates a frame structure and a pilot distribution in case some data sub-carriers in a RB are punched and used for LTE-A common pilot insertion, when sub-frames (of the first category) of the LTE-A common pilot are scheduled to the LTE and LTE-A users (UE). As illustrated in FIG. 6, sub-frames #1 and #6 are the sub-frames for transmitting the LTE-A common pilot, which is not transmitted by any other sub-frame. The pilot distributions in case the RBs are scheduled to the LTE user and the LTE-A user are illustrated in sub-frame #1, respectively. When a RB is scheduled to the LTE user, the LTE data signal is punctured off at the pilot insertion position and the LTE-A common pilot is inserted therein. When a RB is scheduled to the LTE-A user, the LTE-A common pilot and the LTE-A special pilot are transmitted after undergoing a code division multiplexing. To be noted, in the two RBs, the insertion position of the LTE-A common pilots are the same. When measuring information such as the channel quality, all the LTE-A users in the system take all RBs in sub-frame #1 as the RBs scheduled to the LTE-A user, and take the common pilot in the RBs actually scheduled to the LTE user as transmitted after being multiplexed with the special pilot, thus the LTE-A user may perform a uniform channel quality measurement.

When a certain LTE UE receives the data of a RB containing the LTE-A common pilot, since the UE does not know that the some data in the RB has been punctured off and inserted with the LTE-A common pilot data, it performs a normal data reception by treating the common pilot as data.

Embodiment 2

As compared with the base station of the first embodiment, as illustrated in the dotted line box of FIG. 3, the base station according to the second embodiment of the present invention further includes a scheduling unit 340. In the second embodiment, in order to reduce the interference brought by the LTE-A common pilot to the LTE user data, the scheduling unit 340 of the base station shall preferentially schedule the first category of sub-frames (e.g., sub-frames #1 and #6) to the LTE-A user during a scheduling.

Embodiment 3

Further, as illustrated in the dashed line box of FIG. 3, as compared with the base stations of the first and second embodiments, the base station according to the third embodiment of the present invention may further include a code modulation scheme changing unit 350. When the scheduling unit 340 schedules the first category of sub-frames to the LTE user, the code modulation scheme changing unit 350 changes the coding scheme or the modulation rate of the symbol of the sub-frame, so that the code modulation scheme becomes more robust. For example, 16 QAM ¾ is changed as 16 QAM ½, QPSK ¾, or QPSK ½, etc.

In the embodiments 1 to 3, the first category of sub-frames may be scheduled to either the LTE user or the LTE-A user, thus the scheduling is more flexible. In addition, a uniform measurement way is adopted for the LTE-A to measure the channel quality, so as to improve the flexibility of user scheduling, reduces the interference on the LTE user, and realize a smooth transition from the LTE system to the LTE-A system.

Embodiment 4

Figure 7:
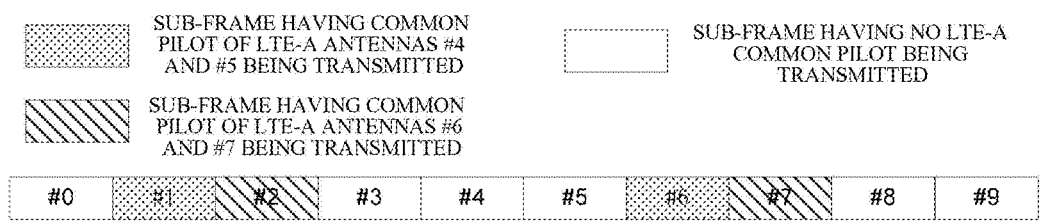
FIG. 7 schematically illustrates the categories of sub-frames of each 10 ms frame in an example according to a fourth embodiment of the present invention.

FIG. 7 schematically illustrates the categories of sub-frames of each 10 ms frame in an example according to a fourth embodiment of the present invention. As illustrated in FIG. 7, 10 sub-frames are classified into two categories. The first category of sub-frames include sub-frames #1, #6, #2 and #7, wherein each RB in sub-frames #1 and #6 transmits the common pilots of antennas #4 and #5, and each RB in sub-frames #2 and #7 transmits the common pilots of antennas #6 and #7. The second category of sub-frames are those other than the sub-frames included in the first category of sub-frames, and the definition is the same as that of the sub-frame as illustrated in FIG. 4.

Figure 8:
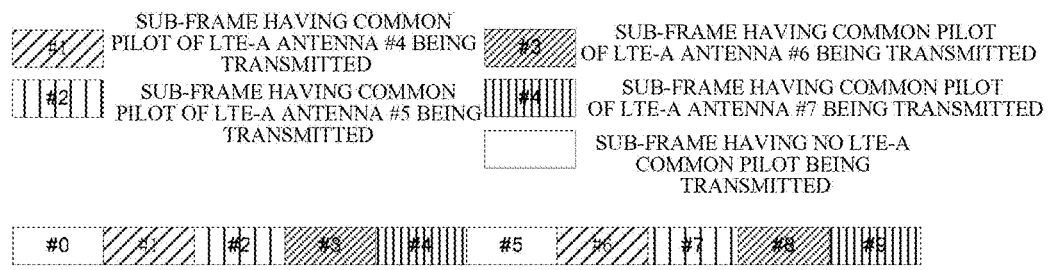
FIG. 8 schematically illustrates the categories of sub-frames of each 10 ms frame in another example according to the fourth embodiment of the present invention.

FIG. 8 schematically illustrates the categories of sub-frames of each 10 ms frame in another example according to the fourth embodiment of the present invention. As illustrated in FIG. 8, the 10 ms sub-frames are classified into two categories. The first category of sub-frames include sub-frames #1, #6, #2, #7, #3, #8, #4 and #9, wherein each RB in sub-frames #1 and #6 transmits the common pilot of antenna #4, each RB in sub-frames #2 and #7 transmits the common pilot of antenna #5, each RB in sub-frames #3 and #8 transmits the common pilot of antenna #6, and each RB in sub-frames #4 and #9 transmits the common pilot of antenna #7.

In the base station according to the fourth embodiment of the present invention, the sub-frame selecting unit 310 selects respective sub-frames in the current frame for transmitting the common pilots of the special antennas, and determines the special antenna(s) whose common pilot(s) being transmitted by each of the sub-frames. The notifying unit 330 notifies the UE, which supports the special antennas and is served by the base station, the selected sub-frame for transmitting a common pilot of a special antenna and the special antenna whose common pilot is transmitted by the selected sub-frame. The transmitting unit 320 transmits the common pilots of corresponding special antennas in the sub-frames in the current frame selected by the sub-frame selecting unit 310 for transmitting the common pilots of the special antennas.

Other aspects of the fourth embodiment may be the same as those of the embodiments 1-3, and herein are omitted.

In the fourth embodiment, the sub-frames in the first category of sub-frames only transmit the common pilots of a part of special antennas. Thus as compared with the first embodiment, when the first category of sub-frames are scheduled to the LTE user, the interferences on the LTE user by the common pilots of the special antennas are reduced.

Embodiment 5

Figure 9:
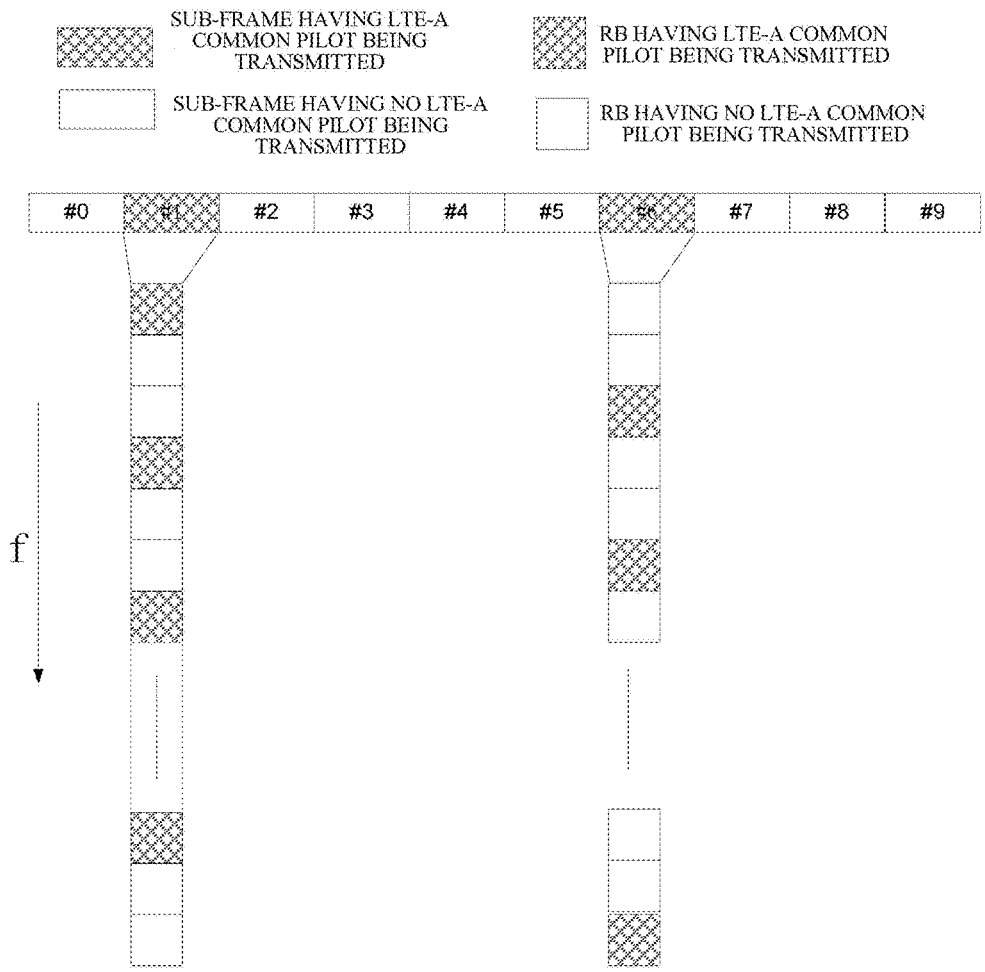
FIG. 9 schematically illustrates the categories of sub-frames and RBs of each 10 ms frame in an example according to a fifth embodiment of the present invention.

FIG. 9 schematically illustrates the categories of sub-frames and RBs of each 10 ms frame in an example according to a fifth embodiment of the present invention. The UE estimates the CSI of each RB using interpolations of time domain and frequency domain. This embodiment is corresponding to the sub-frame classification in FIG. 4, i.e., each RB in the sub-frame transmitting the LTE-A common pilot transmits the common pilots of all the eight antennas. As illustrated in FIG. 9, in sub-frames #1 and #6, all RBs are classified into two categories, i.e., RBs transmitting the LTE-A common pilot and RBs not transmitting the LTE-A common pilot, and these two categories of RBs are arranged alternatively. For example, in sub-frames #1 and #6, two RBs transmitting the LTE-A common pilot are spaced apart by two RBs not transmitting the LTE-A common pilot, and the RBs transmitting the LTE-A common pilot in sub-frames #1 and #6 have different initial positions. The channel estimation value of a RB not transmitting the LTE-A common pilot in sub-frames #1 and #6 may be obtained according to the interpolation of the channel estimation values of the RBs nearest thereto in sub-frames #1 and #6.

To be noted, the above spacing manner is just exemplary, and is not restrictive to the present invention. Two RBs transmitting the common pilot may also be spaced apart by just one RB not transmitting the common pilot, or three or more RBs not transmitting the common pilot.

Figure 10:
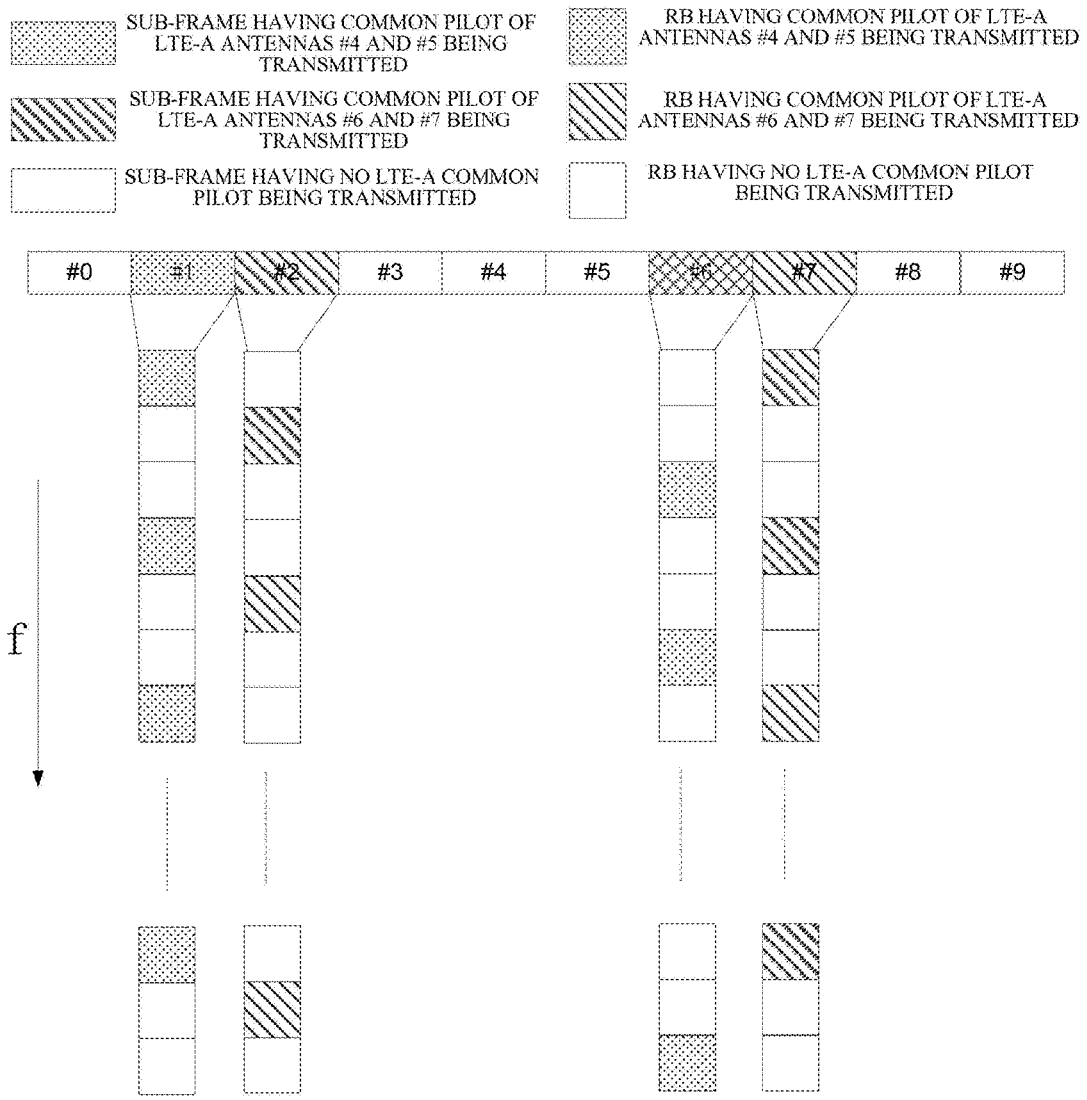
FIG. 10 schematically illustrates the categories of sub-frames and RBs of each 10 ms frame in another example according to the fifth embodiment of the present invention.

FIG. 10 schematically illustrates the categories of sub-frames and RBs of each 10 ms frame in another example according to the fifth embodiment of the present invention. The UE estimates the CSI of each RB using interpolations of time domain and frequency domain. This embodiment is corresponding to the sub-frame classification in FIG. 7. As illustrated in FIG. 10, sub-frames #1 and #6 are configured to transmit the common pilots of antennas #4 and #5, while sub-frames #2 and #7 are configured to transmit the common pilots of antennas #6 and #7. In these sub-frames, all RBs are classified into two categories, i.e., RBs transmitting the LTE-A common pilot and RBs not transmitting the LTE-A common pilot, and these two categories of RBs are arranged alternatively. For example, in sub-frames #1 and #6, two RBs transmitting the LTE-A common pilots of LTE-A antennas #4 and #5 are spaced apart by two RBs not transmitting the LTE-A common pilot, and the RBs transmitting the LTE-A common pilot in sub-frames #1 and #6 have different initial positions. The channel estimation value of a RB not transmitting the LTE-A common pilot in sub-frames #1 and #6 may be obtained according to the interpolation of the channel estimation values of the RBs nearest thereto in sub-frames #1 and #6. Sub-frames #2, #7 have similar manners of pilot insertion and interpolation.

Figure 11:
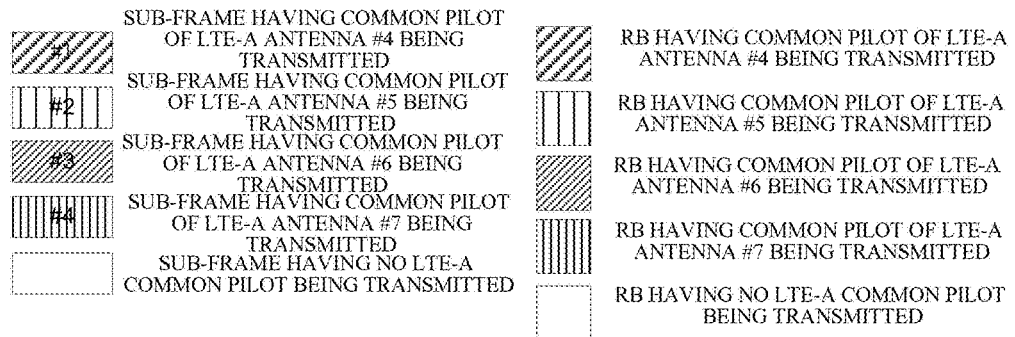
FIG. 11 schematically illustrates the categories of sub-frames and RBs of each 10 ms frame in yet another example according to the fifth embodiment of the present invention.
Figure 11:
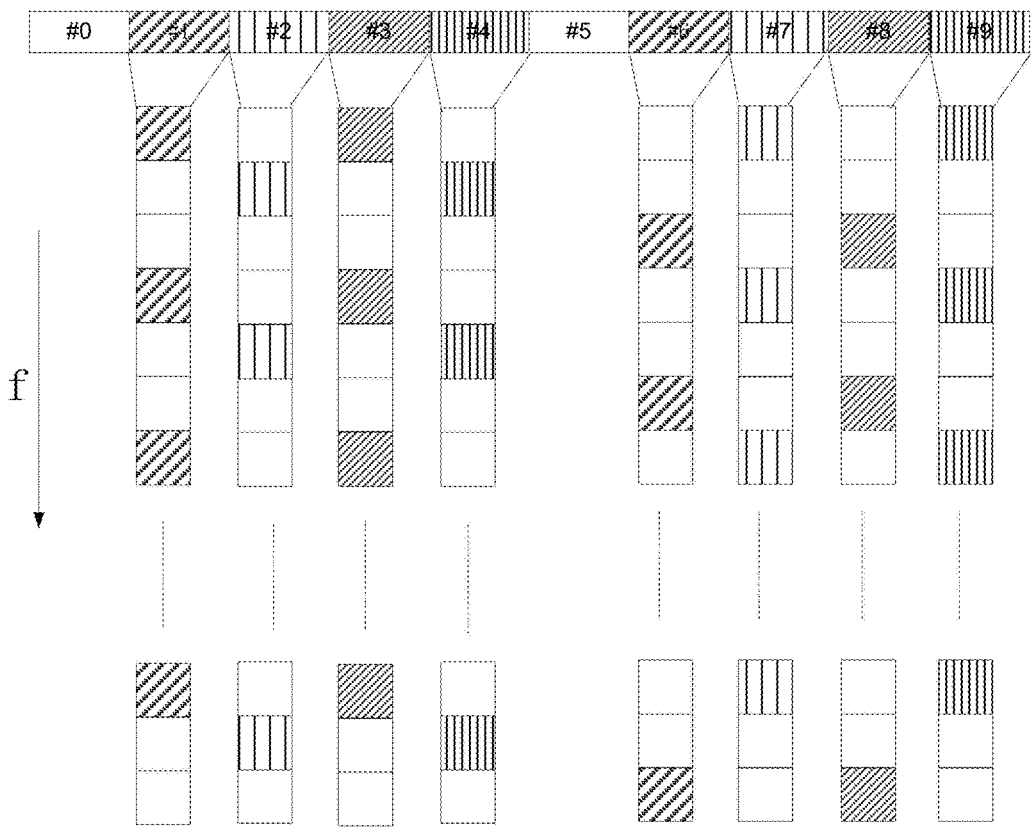

FIG. 11 schematically illustrates the categories of sub-frames and RBs of each 10 ms frame in yet another example according to the fifth embodiment of the present invention. The UE estimates the CSI of each RB using interpolations of time domain and frequency domain. This embodiment is corresponding to the sub-frame classification in FIG. 8. As illustrated in FIG. 11, sub-frames #1 and #6 are configured to transmit the common pilot of antenna #4, sub-frames #2 and #7 are configured to transmit the common pilot of antenna #5, sub-frames #3 and #8 are configured to transmit the common pilot of antenna #6, and sub-frames #4 and #9 are configured to transmit the common pilot of antenna #7. In these sub-frames, all RBs are classified into two categories, i.e., RBs transmitting the LTE-A common pilot and RBs not transmitting the LTE-A common pilot, and these two categories of RBs are arranged alternatively. For example, in sub-frames #1 and #6, two RBs transmitting the LTE-A common pilot of LTE-A antenna #4 are spaced apart by two RBs not transmitting the LTE-A common pilot, and the RBs transmitting the LTE-A common pilot in sub-frames #1 and #6 have different initial positions. The channel estimation value of a RB not transmitting the LTE-A common pilot in sub-frames #1 and #6 may be obtained according to the interpolation of the channel estimation values of the RBs nearest thereto in sub-frames #1 and #6. Sub-frames #2 and #7 have similar manners of pilot insertion and interpolation.

In the fifth embodiment, only a part of RBs in the first category of sub-frames transmit the common pilots of the special antennas. Thus as compared with the first embodiment, when the first category of sub-frames are scheduled to the LTE user, the interferences on the LTE user by the common pilots of the special antennas are reduced.

Further to be noted, in the frame structures of respective embodiments as illustrated in FIGS. 7 to 11, any RB transmitting a common pilot of the special antenna can transmit the common pilot of the special antenna in a manner as illustrated in FIGS. 6 and/or 5.

Figure 12:
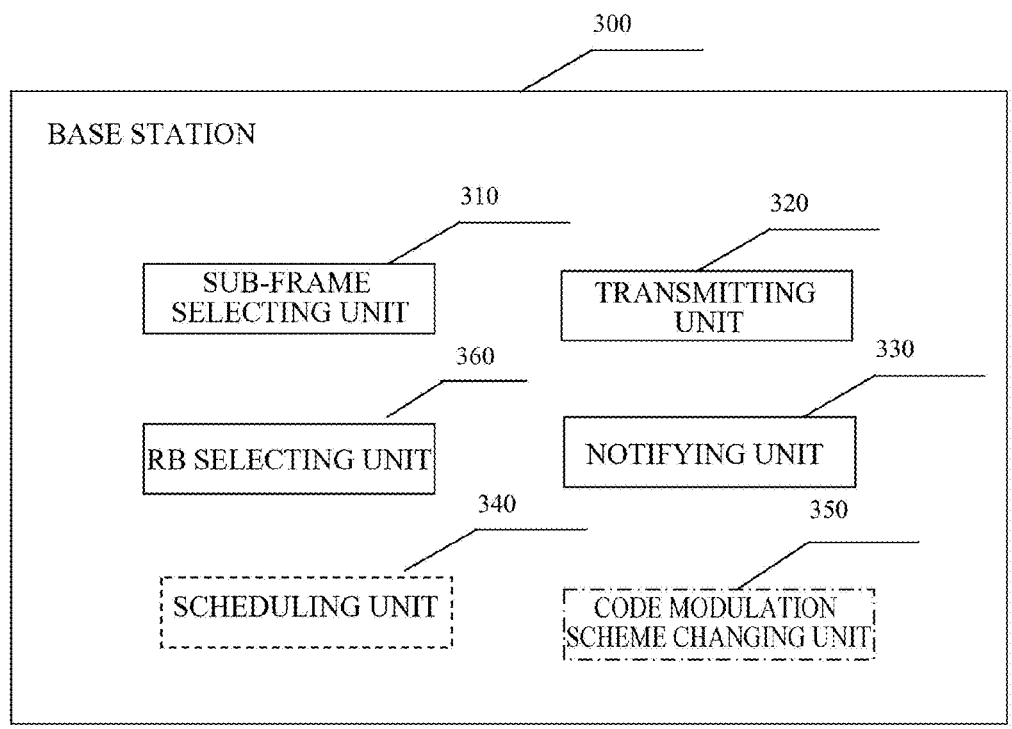
FIG. 12 illustrates a base station according to the fifth embodiment of the present invention.

FIG. 12 schematically illustrates a block diagram of a base station according to the fifth embodiment of the present invention. As illustrated in FIG. 12, the base station according to the fifth embodiment further includes a RB selecting unit 360. The sub-frame selecting unit 310 selects a sub-frame in the current frame for transmitting a common pilot of the special antenna. The RB selecting unit 360 selects a RB transmitting the common pilot of the special antenna, from the sub-frame selected by the sub-frame selecting unit for transmitting the common pilot of the special antenna. The notifying unit 330 notifies the UE which supports the special antennas and is served by the base station the selected sub-frame and RB for transmitting a common pilot of a special antenna. The transmitting unit 320 transmits, at the RB selected by the RB selecting unit 360, a signal having the common pilot of the special antenna. The notifying unit 330 for example notifies, at the first RB of the sub-frame which transmits the common pilot of the special antenna and is selected by sub-frame selecting unit 310, a RB which transmits the common pilot of the special antenna and is selected by the RB selecting unit 360.

Similarly, the base station according to the fifth embodiment of the present invention may also include the scheduling unit 340 and/or the code modulation scheme changing unit 350 with the same functions as described previously. Details are omitted herein.

Figure 13:
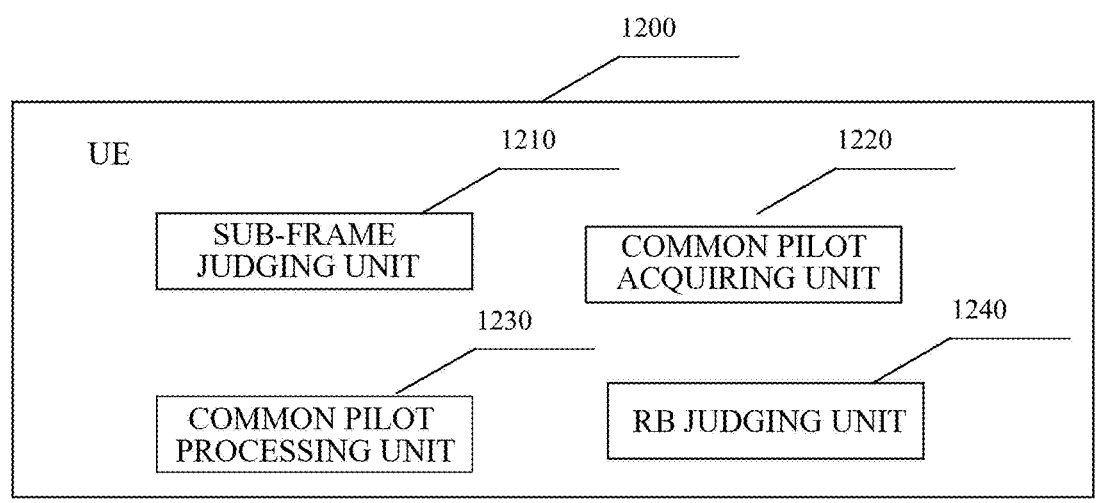
FIG. 13 illustrates a mobile station according to an embodiment of the present invention.

FIG. 13 illustrates a UE according to an embodiment of the present invention. As illustrated in FIG. 13, according to an embodiment of the present invention, a UE includes: a sub-frame judging unit 1210 configured to judge whether a current sub-frame is a first category of sub-frame that transmits a common pilot of a special antenna; a common pilot acquiring unit 1220 configured to acquire the common pilot of the special antenna from the current sub-frame, when the sub-frame judging unit 1210 judges that the current sub-frame is the first category of sub-frame; a common pilot processing unit 1230 configured to perform a processing of the common pilot of the special antenna, e.g., measuring the communication quality of the system.

In an example, there are several special antennas, and the sub-frame judging unit 1210 further judges the special antenna(s) whose common pilot(s) being transmitted by the current sub-frame. The common pilot acquiring unit 1220 acquires the common pilot(s) of the determined one or more special antennas from the current sub-frame. The common pilot processing unit 1230 measures the communication quality etc. of the one or more special antennas determined according to the judgment result.

In an example, the receiver further includes a RB judging unit 1240 configured to judge whether a current RB transmits a common pilot of a special antenna in the current sub-frame judged by the sub-frame judging unit 1210 as transmitting the common pilot of the special antenna. The common pilot acquiring unit 1220 acquires the common pilot of the special antenna from the current RB, when the RB judging unit 1240 judges that the current RB transmits the common pilot of the special antenna. The common pilot processing unit 1230 performs the processing of the common pilot of the special antenna according to the acquired common pilot of the special antenna.

To be noted, although as aforementioned, after the sub-frame judging unit 1210 judges that the current sub-frame transmits the common pilot of the special antenna, the RB judging unit 1240 judges whether the current RB transmits the common pilot of the special antenna, the above two works can be done by the RB judging unit 1240. The sub-frame judging unit 1210 and the RB judging unit 1240 perform such judgments for example according to indexes of sub-frame and RB which transmit the common pilot of the special antenna as notified by the base station.

In an example, the common pilot acquiring unit 1220 of the UE acquires the common pilot from the sub-frame by treating the first category of sub-frames as those transmitted to another EU supporting the special antenna, in which the common pilot of the special antenna is multiplexed with the special pilot of the special antenna.

In an example, the common pilot acquiring unit 1220 of the UE acquires the common pilot from the RB by treating the RBs that transmit the common pilot of the special antenna as those transmitted to another EU supporting the special antenna, in which the common pilot of the special antenna is multiplexed with the special pilot of the special antenna.

In an example, the common pilot acquiring unit 1220 of the UE acquires the common pilot from the sub-frame by treating the first category of sub-frames as those transmitted to a EU not supporting the special antenna, in which the common pilot is taken as data transmitted to the UE.

In an example, the common pilot acquiring unit 1220 of the UE acquires the common pilot from the RB by treating the RBs that transmit the common pilot of the special antenna as those transmitted to another EU not supporting the special antenna.

The features described in one embodiment or example of the above UE and base station may combine or replace those in another embodiment or example.

Figure 14:
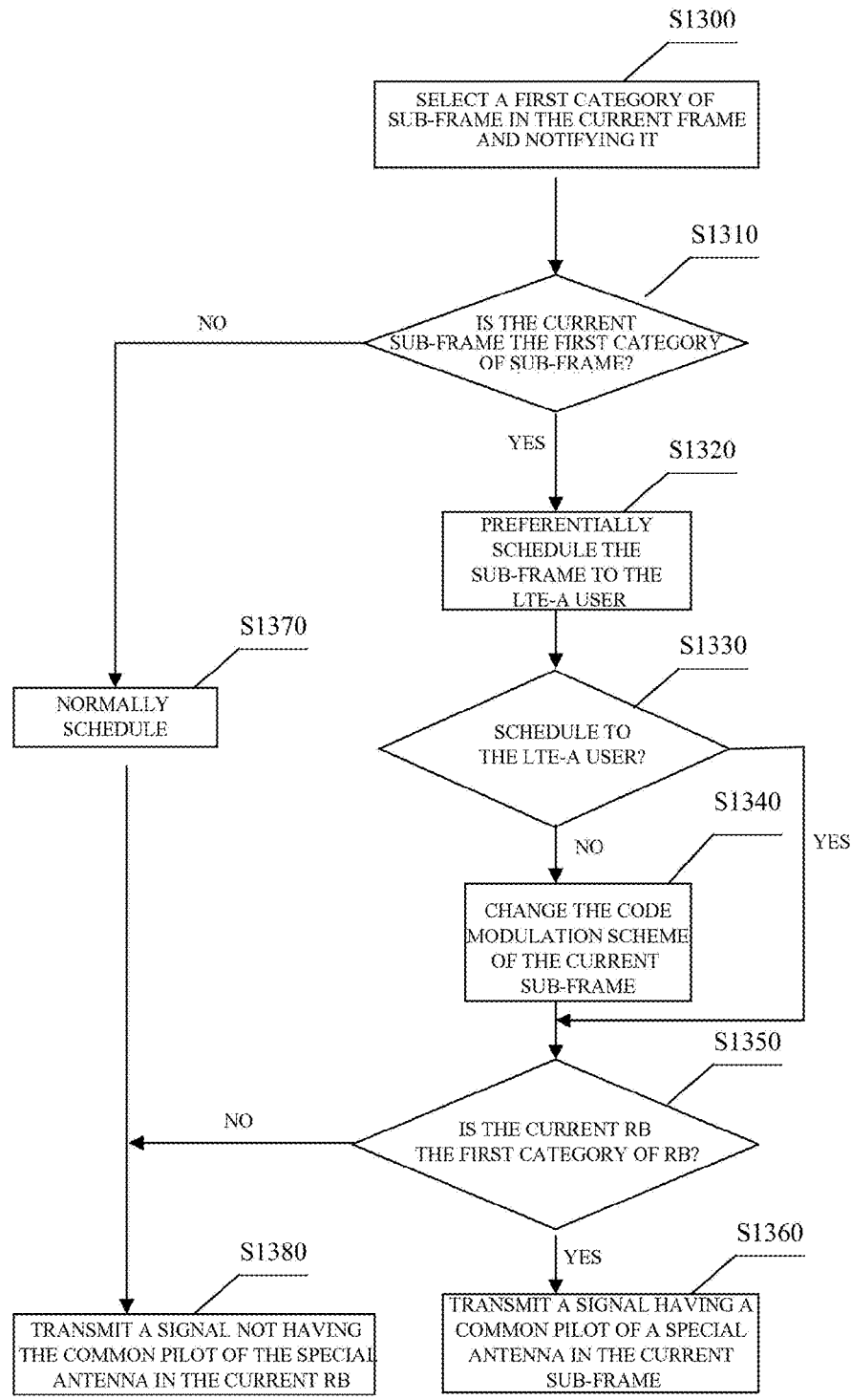
FIG. 14 schematically illustrates a flowchart of a communication method according to an embodiment of the present invention.

FIG. 14 schematically illustrates a flowchart of a communication method according to an embodiment of the present invention. As illustrated in FIG. 14, firstly in step S1300, a sub-frame selecting unit 310 selects a sub-frame in the current frame for transmitting a common pilot of the special antenna. The notifying unit 330 issues a notification, and when the current sub-frame is a first category of sub-frame that transmits a common pilot of a special antenna (step S1310, Yes), a scheduling unit 340 preferentially schedules the sub-frame to the LTE-A user at step S1320. Next, it is judged in step S1330 whether the sub-frame is scheduled to the LTE-A user, if not, i.e., the sub-frame is scheduled to the LTE user (step S1330, No), a code modulation scheme changing unit 350 changes a code modulation scheme of the sub-frame so that it is more robust, and the flow goes to step S1350. If the sub-frame is scheduled to the LTE-A user (step S1330, Yes), the flow directly enters step S1350. It is judged in step S1350 whether the current RB is a first category of RB that transmits a common pilot of a special antenna. If so, a transmitting unit 320 transmits a signal having the common pilot of the special antenna in step S1360, otherwise, if the current RB is not a first category of RB that transmits a common pilot of a special antenna, the transmitting unit 320 transmits a signal not having the common pilot of the special antenna in step S1360.

One the other hand, if it is judged in step S1310 that the current RB is not a first category of RB that transmits a common pilot of a special antenna (step S1310, No), the scheduling unit 340 performs a normal scheduling in step S1370, and the flow enters step S1380 where the signal not having the common pilot of the special antenna is transmitted in the current RB.

To be noted, the signal transmitted in step S1360 may include the common pilots of all or a part of the special antennas.

Still to be noted, the above steps may be changed, adjusted and deleted upon the actual request, e.g., steps S1330 and S1340 may be omitted. A person skilled in the art may conceive of various changes and adjustments based on the above descriptions of the base station and the frame structure.

Embodiment 6

Figure 15:
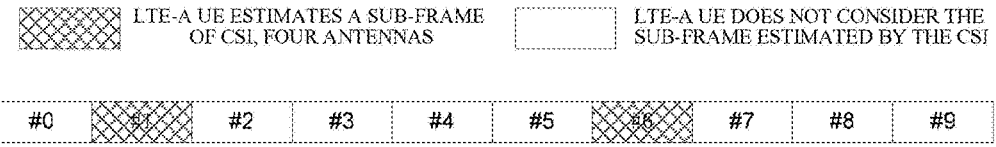
FIG. 15 schematically illustrates the categories of sub-frames of a frame according to a sixth embodiment of the present invention.

FIG. 15 schematically illustrates the categories of sub-frames of a frame according to a sixth embodiment of the present invention. As illustrated in FIG. 15, ten sub-frames are classified into two categories. The first category of sub-frames include sub-frames #1 and #6 for all the LTE-A users in the system to perform a channel value estimation CSI using 4 antennas. The second category of sub-frames include sub-frames other than sub-frames #1 and #6, in which each RB performs a pilot channel estimation using the 4 existing LTE antennas whether the RB is scheduled to the LTE-A user or the LTE user.

This frame structure may be used when the total traffic of the LTE-A user is very few or the number of the LTE-A users is very small.

Figure 16:
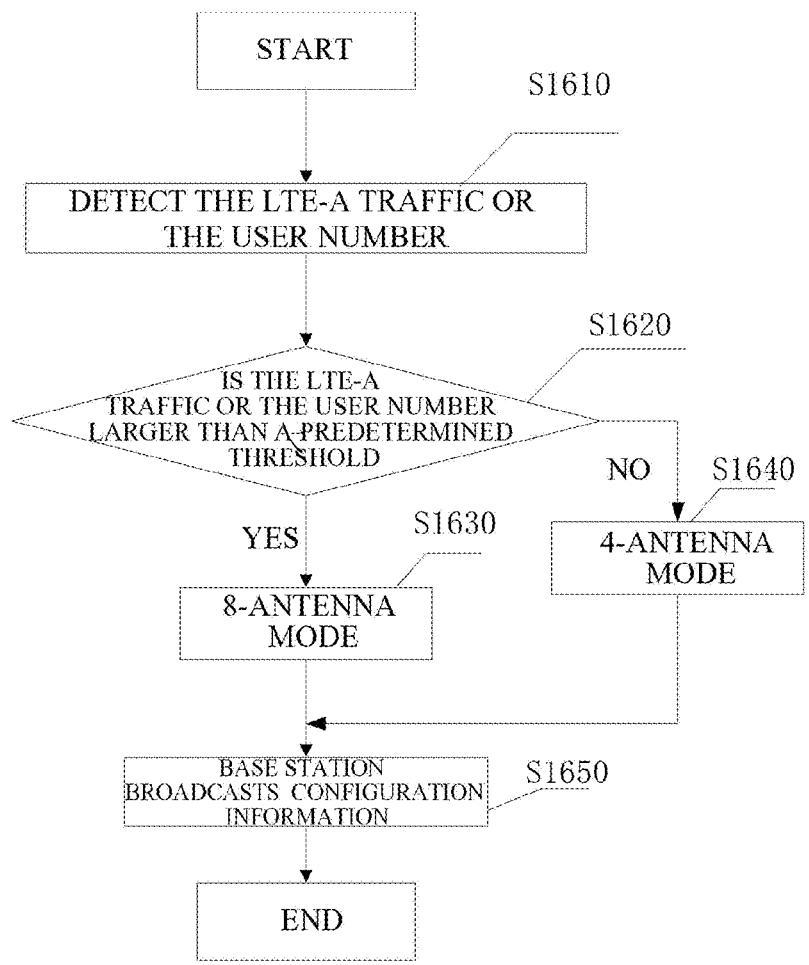
FIG. 16 schematically illustrates a flowchart of switching between an eight-antenna mode and a four-antenna mode according to the sixth embodiment of the present invention.

FIG. 16 schematically illustrates a flowchart of switching between an eight-antenna mode and a four-antenna mode according to the sixth embodiment of the present invention. As illustrated in FIG. 16, firstly in step S1610, a judging unit 310 of the base station detects the traffic or the user number of an LTE-A UE accessed in the current system, and judges whether the traffic or the user number of the LTE-A UE is larger than a predetermined traffic threshold or number. If the traffic of the LTE-A UE is larger than the predetermined traffic threshold or the number of the LTE-A UE is larger than the predetermined number (S1620, Yes), the antenna mode is set in an eight-antenna mode (S1630), otherwise switched to a four-antenna mode (S1620, Yes). Finally, a notifying unit 330 for example notifies respective LTE-A users of broadcasting configuration information through the BCH channel, including the selected antenna mode, the categories of the sub-frames, etc.

Under the four-antenna mode, the common pilot of the special antenna is no longer transmitted even in the first category of sub-frames. But the first category of sub-frames are still used for the LTE-A user to perform a channel quality estimation. In that case, the LTE-A user no longer estimates the channel quality of antennas 4 to 7, i.e., the LTE-A user degrades into the LTE user.

To be noted, although as mentioned above the switching condition is the user number and/or the traffic of the LTE-A, other switching condition may be adopted, e.g., the service quality.

Figure 17:
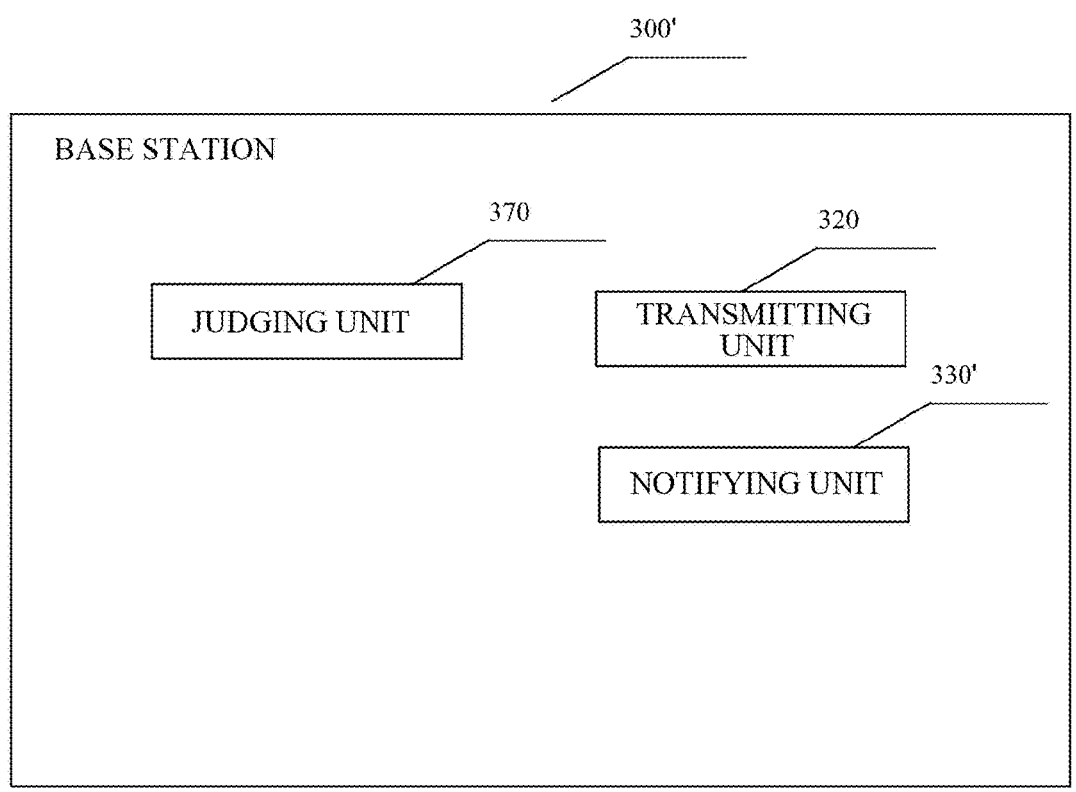
FIG. 17 illustrates a base station according to the sixth embodiment of the present invention.

FIG. 17 schematically illustrates a structural block diagram of a base station according to the sixth embodiment of the present invention. According to the aspect of the sixth embodiment, a base station 300' includes a judging unit 370, a transmitting unit 320 and a notifying unit 330'. The judging unit 370 judges whether a condition of switching into a degrading mode (i.e., a mode not transmitting a common pilot of a special antenna) is satisfied, e.g., judges whether the traffic of the UE, which supports the special antenna and is served by the base station, is larger than the predetermined volume. The transmitting unit 320 transmits a signal having the common pilot of the special antenna in the sub-frame transmitting the common pilot of the special antenna, when the judging unit 370 judges that the condition of switching into the degrading mode is not satisfied, e.g., the traffic of the UE, which supports the special antenna and is served by the base station, is larger than the predetermined volume. The notifying unit 330' notifies the UE, which supports the special antenna, not to transmit the common pilot of the special antenna, when the judging unit 370 judges that the condition of switching into the degrading mode is satisfied.

Apparently, the sixth embodiment may be combined with other embodiment. For example, the base stations of FIGS. 3 and 12 may adopt the judging unit and the notifying unit of FIG. 17.

In addition, to be noted, in the sixth embodiment of the present invention, when the eight-antenna mode is switched into, the common pilot of the special antenna may be transmitted in the aforementioned method according to the embodiment of the present invention, or the method of the prior art.

The above apparatus and method of the present invention may be implemented by hardware, or a combination of hardware and software. The present invention relates to such a computer readable program that enables a logic part to implement the previously described apparatuses or components, or implement the previously described methods or steps, when the program is executed by the logic part. The present invention also relates to storage medium for storing the above program, e.g., hard disk, magnetic disk, optical disk, DVD and flash memory.

The present invention is described in conjunction with the above detailed embodiments. But a person skilled in the art shall be appreciated that the descriptions are just exemplary, instead of limitations to the protection scope of the present invention. A person skilled in the art can make various modifications and changes to the present invention based on spirit and principle of the present invention, and those modifications and changes are also within the scope of the present invention.

What is claimed is:

1. A base station, comprising:
    a common antenna configured to transmit signals to mobile stations (UEs) served by the base station;
    a special antenna configured to transmit a signal to a UE which is served by the base station and supports the special antenna;
    a sub-frame selecting unit configured to select a sub-frame for transmitting a common pilot of the special antenna in the current frame;
    a resource block (RB) selecting unit configured to select a RB for transmitting the common pilot of the special antenna, in the sub-frame for transmitting the common pilot of the special antenna selected by the sub-frame selecting unit;
    a notifying unit configured to notify the UE, which supports the special antenna, of the selected sub-frame and RB for transmitting the common pilot of the special antenna;
    a transmitting unit configured to transmit a signal having the common pilot of the special antenna in the RB selected by the RB selecting unit,
    wherein the mobile stations served by the base station comprise mobile stations supporting more antennas and mobile stations supporting less antennas, a special antenna is an antenna supported by the mobile stations supporting more antennas but not supported by the mobile stations supporting less antennas.

2. The base station according to claim 1, wherein there are a plurality of special antennas, the transmitting unit transmits all or a part of the common pilots of the special antennas in the RB selected by the RB selecting unit.

3. The base station according to claim 1, further comprising a scheduling unit that preferentially schedules the sub-frame for transmitting the common pilot of the special antenna selected by the sub-frame selecting unit to the UE supporting the special antenna.

4. The base station according to claim 1, further comprises:
a judging unit, the judging unit judges whether or not to switch into a mode that does not transmit the common pilot of the special antenna;
the transmitting unit transmits the signal having the common pilot of the special antenna in the sub-frame for transmitting the common pilot of the special antenna selected by the sub-frame selecting unit, when the judging unit judges not to switch into the mode that does not transmit the common pilot of the special antenna;
the notifying unit notifies the UE supporting the special antenna not to transmit the common pilot of the special antenna, when the judging unit judges to switch into the mode that does not transmit the common pilot of the special antenna.

5. A base station, comprising:
a judging unit;
a transmitting unit; and
a notifying unit; wherein
the judging unit judges whether or not to switch into a mode that does not transmit a common pilot of special antenna;
the transmitting unit does transmit a signal having the common pilot of the special antenna in any of the sub-frames, when the judging unit judges not to switch into the mode that does not transmit the common pilot of the special antenna;
the notifying unit notifies the UE supporting the special antenna not to transmit the common pilot of the special antenna, when the judging unit judges to switch into the mode that does not transmit the common pilot of the special antenna, and
the mobile stations served by the base station comprise mobile stations supporting more antennas and mobile stations supporting less antennas, a special antenna is an antenna supported by the mobile stations supporting more antennas but not supported by the mobile stations supporting less antennas.

6. A UE served by a base station and supporting a special antenna, comprising:

a resource block (RB) judging unit configured to judge whether a current RB transmits a common pilot of a special antenna;
a common pilot acquiring unit configured to acquire the common pilot of the special antenna from the current RB, when the RB judging unit judges that the current RB transmits the common pilot of the special antenna;
a processing unit configured to perform a processing of the common pilot of the special antenna for the common pilot acquired by the common pilot acquiring unit,
wherein the mobile stations served by the base station comprise mobile stations supporting more antennas and mobile stations supporting less antennas, a special antenna is an antenna supported by the mobile stations supporting more antennas but not supported by the mobile stations supporting less antennas.

7. The UE according to claim 6, wherein there are a plurality of special antennas, the RB judging unit further judges the one(s) among the plurality of special antennas whose common pilot(s) being transmitted by the current RB, and the common pilot acquiring unit acquires the common pilot(s) of the judged special antenna(s).

8. The UE according to claim 6, wherein the common pilot acquiring unit treats the RB transmitting the common pilot of the special antenna judged by the RB judging unit as a RB scheduled to a UE not supporting the special antenna, so as to acquire a channel estimation value from the RB.

9. The UE according to claim 6, wherein the common pilot acquiring unit treats the RB transmitting the common pilot of the special antenna judged by the RB judging unit as a RB scheduled to another UE supporting the special antenna, so as to acquire a channel estimation value from the RB transmitting the common pilot of the special antenna.

10. The UE according to claim 6, wherein during a calculation of a channel estimation value of a RB not transmitting the common pilot of the special antenna in the sub-frame containing RBs transmitting the common pilot of the special antenna, the processing unit selects channel estimation values of RBs transmitting the common pilot of the special antenna adjacent in time and frequency domains to the RB not transmitting the common pilot of the special antenna, and acquires the channel estimation value of the RB not transmitting the common pilot of the special antenna through an interpolation of these channel values in proportion.

* * * * *